US009905055B2

United States Patent
Smith et al.

(10) Patent No.: US 9,905,055 B2
(45) Date of Patent: Feb. 27, 2018

(54) AUTOMATED TRANSIT VALIDATION RULE UPDATING

(71) Applicant: Cubic Corporation, San Diego, CA (US)

(72) Inventors: Gavin Smith, Crawley (GB); Steffen Reymann, Reigate (GB); Jon Packham, Ashford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/165,252

(22) Filed: May 26, 2016

(65) Prior Publication Data

US 2017/0053458 A1 Feb. 23, 2017

Related U.S. Application Data

(60) Provisional application No. 62/206,133, filed on Aug. 17, 2015.

(51) Int. Cl.
G07B 15/02 (2011.01)
G07B 15/00 (2011.01)
(Continued)

(52) U.S. Cl.
CPC ............ G07B 15/00 (2013.01); G06Q 10/06 (2013.01); G06Q 20/401 (2013.01);
(Continued)

(58) Field of Classification Search
CPC ..... G06Q 20/20; G06Q 20/0655; G06F 21/32
(Continued)

(56) References Cited

U.S. PATENT DOCUMENTS

2004/0099732 A1* 5/2004 Andrews .............. G06Q 20/363
235/380
2008/0033880 A1* 2/2008 Fiebiger ................ G06Q 20/20
705/44
(Continued)

FOREIGN PATENT DOCUMENTS

WO 2011/106179 A2 9/2011
WO 2014/153474 A1 9/2014

OTHER PUBLICATIONS deKozan, Davis, "Payment Strategies and Considerations for Transit", Feb. 5, 2014, securetechalliance.org, 28 pages.*
(Continued)

*Primary Examiner* — Shannon Campbell
*Assistant Examiner* — Freda A Nelson
(74) *Attorney, Agent, or Firm* — Kilpatrick Townsend & Stockton, LLP

(57) ABSTRACT

Techniques are disclosed for automatically determining and implementing fare validation rules based on analysis of rejected transactions from one or more fare validators. In some embodiments, a server or other monitoring system can monitor rejected transactions, determine a common characteristic among all the rejected transactions, and create a validation rule change that would permit the use of fare media having the common characteristic. In some embodiments, the validation rule change may be reviewed and/or modified by a transit agent or other human supervisor. Accordingly, among other benefits, validation rule changes can be automatically created and quickly implemented where a number of rejected transactions indicate previous validation rules may be incorrect.

20 Claims, 6 Drawing Sheets

(51) Int. Cl.
*G07C 9/00* (2006.01)
*G06Q 10/06* (2012.01)
*G06Q 20/40* (2012.01)
*G06Q 10/10* (2012.01)

(52) U.S. Cl.
CPC ....... *G06Q 20/405* (2013.01); *G07C 9/00031* (2013.01); *G06Q 10/10* (2013.01)

(58) Field of Classification Search
USPC .................. 705/13, 17, 39, 5; 235/379, 380; 340/5.32
See application file for complete search history.

(56) References Cited

U.S. PATENT DOCUMENTS

| 2009/0210299 | A1* | 8/2009 | Cowen ................... | G06Q 20/10 705/13 |
| 2010/0089995 | A1* | 4/2010 | El-Awady .............. | G06Q 20/14 235/375 |
| 2012/0221381 | A1* | 8/2012 | Dixon .................... | G06Q 20/20 705/13 |

OTHER PUBLICATIONS deKozan, Davis, "Account Based Processing, Open Payments and Mobile", 2014, www.apta.com, 2014 revenue management Summit, 17 pages.*

TTC Fare Collection Study, Oct. 2000, Toronto Fare Commission, 95 pages.*

International Search Report and Written Opinion dated Oct. 4, 2016 for International Application No. PCT/US2016/041269, filed Jul. 7, 2016; all pages.

* cited by examiner

AUTOMATED TRANSIT VALIDATION RULE UPDATING

CROSS-REFERENCES TO RELATED APPLICATIONS

The present application claims benefit under 35 USC 119(e) of U.S. Provisional Application No. 62/206,133, filed on Aug. 17, 2015, entitled "Actionable Rejected Ticket Analysis," which is incorporated by reference herein in their entirety.

BACKGROUND

Fare validation is used to determine access to services within a transit system. In general, fare validation involves a check to see whether a particular fare media (e.g., a transit ticket) is valid at a particular fare media validator of the transit system (e.g., to enable a transit user to pass through a turnstile or other access control point within the transit system). This can involve a fare validator reading information from the fare media and using a set of validation rules to determine whether the fare media is valid at a particular location, during a particular time, on a particular date, and the like. When a fare media does not pass validation, it can result in a rejected transaction in which a transit user is denied a ride or other service transit system.

In traditional transit systems, it may take a long time to determine that a set of fare validation rules is incorrect. Such systems may require manually changing the validation rules, which may only be prompted in response to complaints by transit user. Such inefficiencies can result in a poor transit user experience, among other problems.

BRIEF SUMMARY

Techniques are disclosed for automatically determining and implementing fare validation rules based on analysis of rejected transactions from one or more fare validators. In some embodiments, a server or other monitoring system can monitor rejected transactions, determine a common characteristic among all the rejected transactions (e.g., when a threshold number of rejected transactions occurs within a certain period of time), and create a validation rule change that would permit the use of fare media having the common characteristic. In some embodiments, the validation rule change may be reviewed and/or modified by a transit agent or other human supervisor. Accordingly, among other benefits, validation rule changes can be automatically created and quickly implemented where a number of rejected transactions indicate previous validation rules may be incorrect.

An example computer server, according to the disclosure, comprises a communication interface configured to obtain a plurality of rejected transactions from one or more fare media validators of a transit system, each rejected transaction of the plurality of rejected transactions indicative of when a fare media was not able to be validated by one of the one or more fare media validators of the transit system, and a processing unit coupled with the communication interface. The processing unit is configured to analyze the plurality of rejected transactions to determine at least one common characteristic among all rejected transactions of the plurality of rejected transactions causing, at least in part, the rejection of each rejected transaction of the plurality of rejected transactions, and determine a validation rule change based on the analysis of the plurality of rejected transactions. The validation rule change is a change in one or more validation rules used by the one or more fare media validators of the transit system. The validation rule change, when implemented by the one or more fare media validators of the transit system, is configured to cause the one or more fare media validators of the transit system to allow future transactions having the at least one common characteristic, resulting in the one or more fare media validators of the transit system validating fare media used in the future transactions. The processing unit is further configured to send, via the communication interface, information indicative of the validation rule change to the one or more fare media validators.

An example method of updating one or more validation rules in a transit system, according to the disclosure, comprises obtaining a plurality of rejected transactions from one or more fare media validators of the transit system, each rejected transaction of the plurality of rejected transactions indicative of when a fare media was not able to be validated by one of the one or more fare media validators of the transit system, and analyzing, with a processing unit, the plurality of rejected transactions to determine at least one common characteristic among all rejected transactions of the plurality of rejected transactions causing, at least in part, the rejection of each rejected transaction of the plurality of rejected transactions. The method further includes determining a validation rule change based on the analyzing, where the validation rule change is a change in the one or more validation rules used by the one or more fare media validators of the transit system, and the validation rule change, when implemented by the one or more fare media validators of the transit system, would cause the one or more fare media validators of the transit system to allow future transactions having the at least one common characteristic, resulting in the one or more fare media validators of the transit system validating fare media used in the future transactions. The method also comprises sending, via the communication interface, information indicative of the validation rule change to the one or more fare media validators.

An example non-transitory computer-readable medium, according to the disclosure, has instructions embedded thereon for updating one or more validation rules in a transit system. The instructions include computer code for obtaining a plurality of rejected transactions from one or more fare media validators of the transit system. Each rejected transaction of the plurality of rejected transactions is indicative of when a fare media was not able to be validated by one of the one or more fare media validators of the transit system. The instructions also include computer code for analyzing the plurality of rejected transactions to determine at least one common characteristic among all rejected transactions of the plurality of rejected transactions causing, at least in part, the rejection of each rejected transaction of the plurality of rejected transactions. The instructions also include computer code for determining a validation rule change based on the analyzing, where the validation rule change is a change in the one or more validation rules used by the one or more fare media validators of the transit system, and the validation rule change, when implemented by the one or more fare media validators of the transit system, would cause the one or more fare media validators of the transit system to allow future transactions having the at least one common characteristic, resulting in the one or more fare media validators of the transit system validating fare media used in the future transactions. The instructions also include computer code for sending information indicative of the validation rule change to the one or more fare media validators.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

Figure 1:
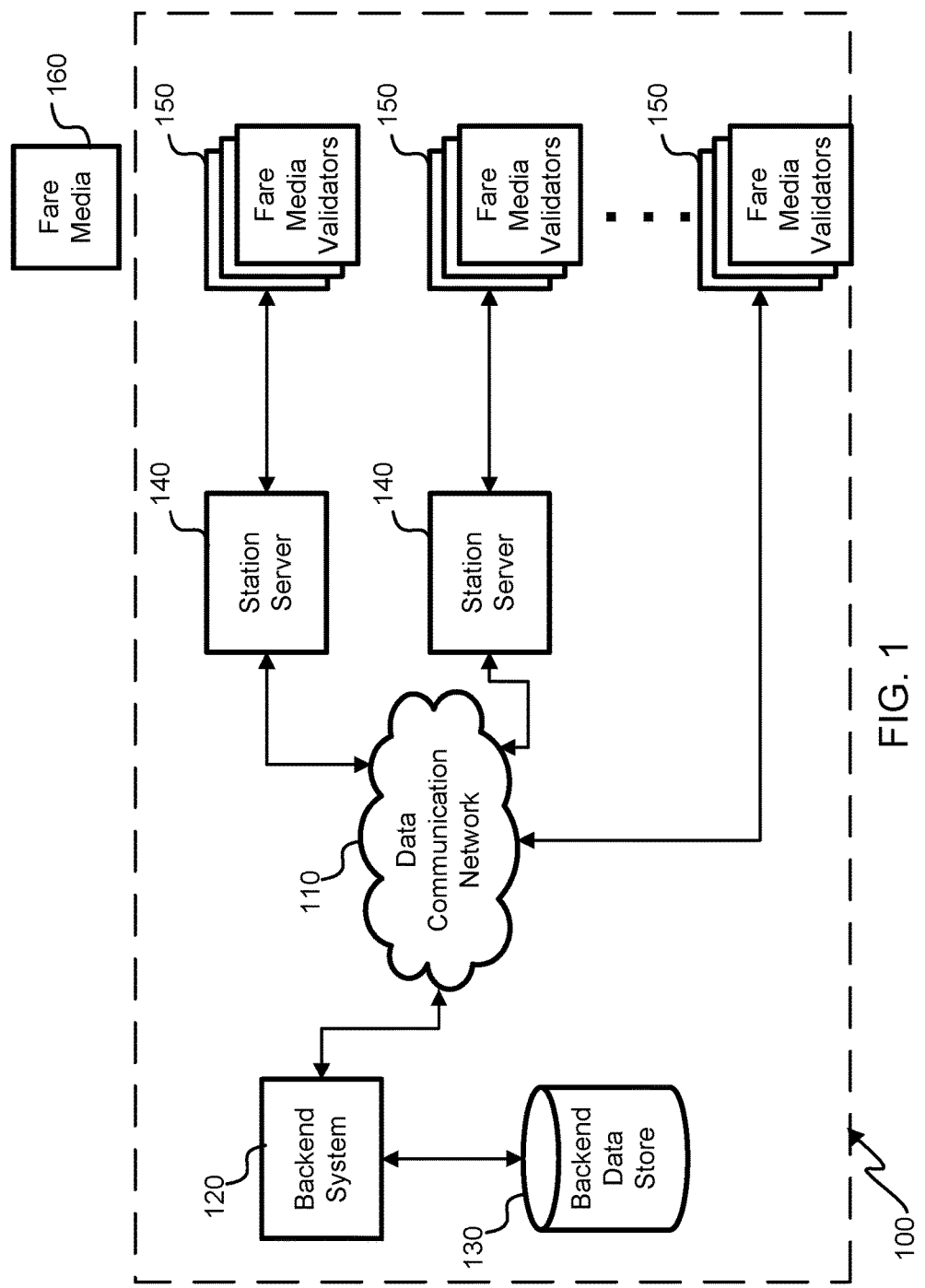
FIG. 1 is a block diagram of a traditional transit system, according to one embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Transit systems use fare validation at fare media validators to determine whether to grant transit users services within the transit system. In general, fare validation involves a check to see whether a particular fare media (e.g., a transit ticket, smart card, virtual ticket/application, transit card, identification card, mobile phone, or other item presented for passage at access control points or for other services within the transit system) is valid at a particular fare media validator of the transit system. This can involve a fare validator reading information from the fare media and using a set of validation rules (also known as "base data") to determine whether the fare media is valid at a particular location, during a particular time, on a particular date, and the like. When a fare media does not pass validation, it can result in a rejected transaction in which a transit user is denied service (e.g., denied access at a turnstile or other access control point) within the transit system.

These fare validation rules can be set by a transit authority managing the transit system and may include rules that permit passage at a fare media validator based on a certain time period, date, location, fare media type, and/or other factors, and can reflect temporary sales, permanent fare types, and/or other rules by which passage at a fare media validator may be accepted or denied. These rules can be stored in a database and propagated throughout the transit system to enable fare media validators to implement the rules when allowing or denying transit users passage through an access control point of the transit system. In traditional transit systems, validation rules are manually created by operators and propagated throughout the transit system.

In many cases, there may be errors in one or more of the validation rules. For example, a transit system may run a temporary offer allowing transit users having a particular fare media type valid only at transit stations in "Zone A" (a limited area) within a transit system to use the fare media at transit stations in "Zone B" and "Zone C" as well. (This type of offer can be made, for example, to interest users in a different type of transit fare media product that may be valid in Zones A, B, and C, to enable transit users additional access in emergency situations, or the like.) But, for any of a variety of reasons, it may be that the validation rules implemented by the transit system are not updated to reflect the temporary offer. This may result transit users being denied access to services at stations in Zones B and C by fare media validators within the transit system in cases where they should instead be granted access.

Traditional transit systems typically are not equipped to quickly determine that a set of fare validation rules is incorrect. For example, the transit system may be unaware of the error in the validation rules until they receive complaints by transit users. Traditional transit systems may also require manually changing the validation rules, which can further delay the correction of the validation rules and propagation of the correct validation rules throughout the transit system. Such inefficiencies can result in a poor transit user experience, among other problems.

As noted previously, techniques disclosed herein enable a transit system to automatically determine and implement fare validation rules based on analysis of rejected transactions from one or more fare validators. In some embodiments, a server or other monitoring system can monitor rejected transactions, determine a common characteristic among all the rejected transactions (e.g., when a threshold number of rejected transactions occurs within a certain period of time), and create a validation rule change that would validate fare media having the common characteristic. In some embodiments, the validation rule change may be reviewed and/or modified by a transit agent or other human supervisor. Accordingly, among other benefits, validation rule changes can be automatically created and quickly implemented where a number of rejected transactions indicate previous validation rules may be incorrect.

FIG. 1 is a block diagram of a traditional transit system 100, according to one embodiment. The transit system can include various forms of transit, including subway, bus, ferry commuter rail, para-transit, etc., or any combination thereof. Here, the transit system 100 can comprise a backend data store 130, a backend system 120, the data communication network 110, a plurality of station servers 140, and a plurality of fare media validators 150. A person having ordinary skill in the art will recognize that a traditional transit system 100 may include or omit any of a variety of components. FIG. 1 is therefore simplification of the actual components used to implement a transit system.

The transit system 100 can include a plurality of station servers 140, each located at different transit stations within the transit system 100. Among other things, the station server 140 can receive and send data to fare media validators 150 of the transit station. Depending on desired functionality, the station server 140 can implement the validation rules by receiving requests from the fare media validators 150 and performing the validation based on the validation rules. Additionally or alternatively, the station server 140 may propagate the validation rules to each of the fare media validators 150 so that the fare media validators 150 themselves can perform validation by implementing the validation rules. In any case, the station server 140 can be used to propagate validation rules throughout the transit system 100 and to provide transaction information from the fare media validators 150 to the backend system 120. The backend system 120 can further summarize and/or store transaction information in the backend data store 130.

Fare media validators 150 are generally used at access control points of the transit system that enable transit users to pass between different areas (e.g., open-access areas, restricted-access areas, etc.) within a transit system. Fare media validators can therefore be used with and/or incorporated into access control points that include, for example, turnstiles, faregates, platform validators, para-transit vehicles, buses, conductor handheld units, or fare boxes at an entry, exit, or other location of a transit station. The number of fare media validators 150 at each station in the transit system 100 can vary, depending on the requirements of the station. At some stations, for example, a single fare media validator 150 may be utilized. Other stations may use two or more fare media validators 150, up to dozens, or even hundreds or more.

Transactions of a transit user (e.g., for passage at an access control point, validation on trains, and/or other services within the transit system) can frequently occur at stations of the transit system 100, although it will be understood that fare media validators 150 can exist elsewhere, such as on busses or trains. Transaction information can be generated by a fare media validator 150 when a fare media 160 is presented at the fare media validator 150 to allow transit user passage through an access control point. This transaction information can include a variety of data, depending on desired functionality. Transaction information can include, for example, a log, summary, or other indication of when certain types of fare media 160 are denied access by one or more fare media validators 150 of the transit system 100. The transaction information may be sent from fare media validators to station servers 140 and from station servers 140 to the backend system 120 based on a scheduled time to transmit the transaction information, periodically, and/or based on a triggering event (such as a request from a remote device). Transaction information can be summarized and/or sent in batches, or sent individually, depending on desired functionality. In some configurations, a station server 140 may not be used, in which case (as shown in FIG. 1) one or more fare media validators 150 may communicate with the backend system 120 via the data communication network 110. In such instances, the one or more fare media validators 150 may perform some or all of the functions described herein performed by the station server 140.

The data communication network 110 can include one or more networks, such as the Internet, which may be public, private, or a combination of both. The data communication network 110 could be packet-switched or circuit-switched connections using telephone lines, coaxial cable, optical fiber, wireless communication, satellite links, and/or other mechanisms for communication. As with communication between other components of the transit system 100, communication between the station servers 140 and the backend system 120 may be in real time (e.g., as transactions occur), periodic, based on triggering events, and/or the like. Thus, the usage of fare media 160 throughout the transit system 100 can be tracked.

It will be understood that embodiments of the transit system 100 can vary, depending on desired functionality. Account-based fare media may be managed, for example, using an account-management server (not shown) that can create, store, and modify user accounts comprise information regarding users of the transit system 100. Each account can include information regarding a transit user, such as a name, address, phone number, email address, user identification (such as a unique identifier of the user or other user ID), passcode (such as a password and/or personal identification number (PIN)), an identification code associated with a fare media used to identify a user and/or a transit user account, information regarding user preferences and user opt-in or opt-out selections for various services, product(s) associated with the transit user account, a value and/or credit associated with the product(s), information regarding a funding source for the transit user account, and more. The transit user account can further comprise transaction information, such as product information and a payment amount. A transit user may request a transit user account and provide the information listed above by phone (such as a call to a customer service center maintained and/or provided by the transit service provider of the transit system 100), on the Internet, at ticket booth, at a ticket vending machine, or by other means.

In embodiments in which transit user accounts are used, transactions, such as validation of fare media 160 at fare media validators 150, can be recorded and/or tracked by the backend system 120 and reconciled with a funding source (not shown) such as a bank or similar entity. The transactions can be reconciled on a per-transaction basis and/or collectively with other transactions, and may be reconciled as transactions are received, on a scheduled or periodic basis, and/or based on a triggering event.

It can be noted that fare media 160 may additionally or alternatively include stored value media. In stored value media, a value (e.g., a monetary amount, a number of rides, etc.) is stored on the fare media 160 itself and used for validation by a fare media validator 150. As the fare media 160 is used within the transit system 100 at various fare media validators 150, the fare media validators 150 read a stored value from the fare media 160 and rewrite this value, reducing (or otherwise modifying) the value by an amount charged to gain access through the fare media validator 150. The stored value therefore acts as a type of currency in the transit system 100. In some embodiments, a transit user may "recharge" the fare media 160, paying money to the transit authority in exchange for an increase in the value stored on the fare media 160.

The transit system 100 of FIG. 1, by itself, may not be equipped to quickly determine that a set of fare validation rules is incorrect in the manner described above. Thus, additional components can be utilized to implement techniques described herein. Embodiments of systems with these components are shown in FIGS. 2A and 2B.

Figure 2A:
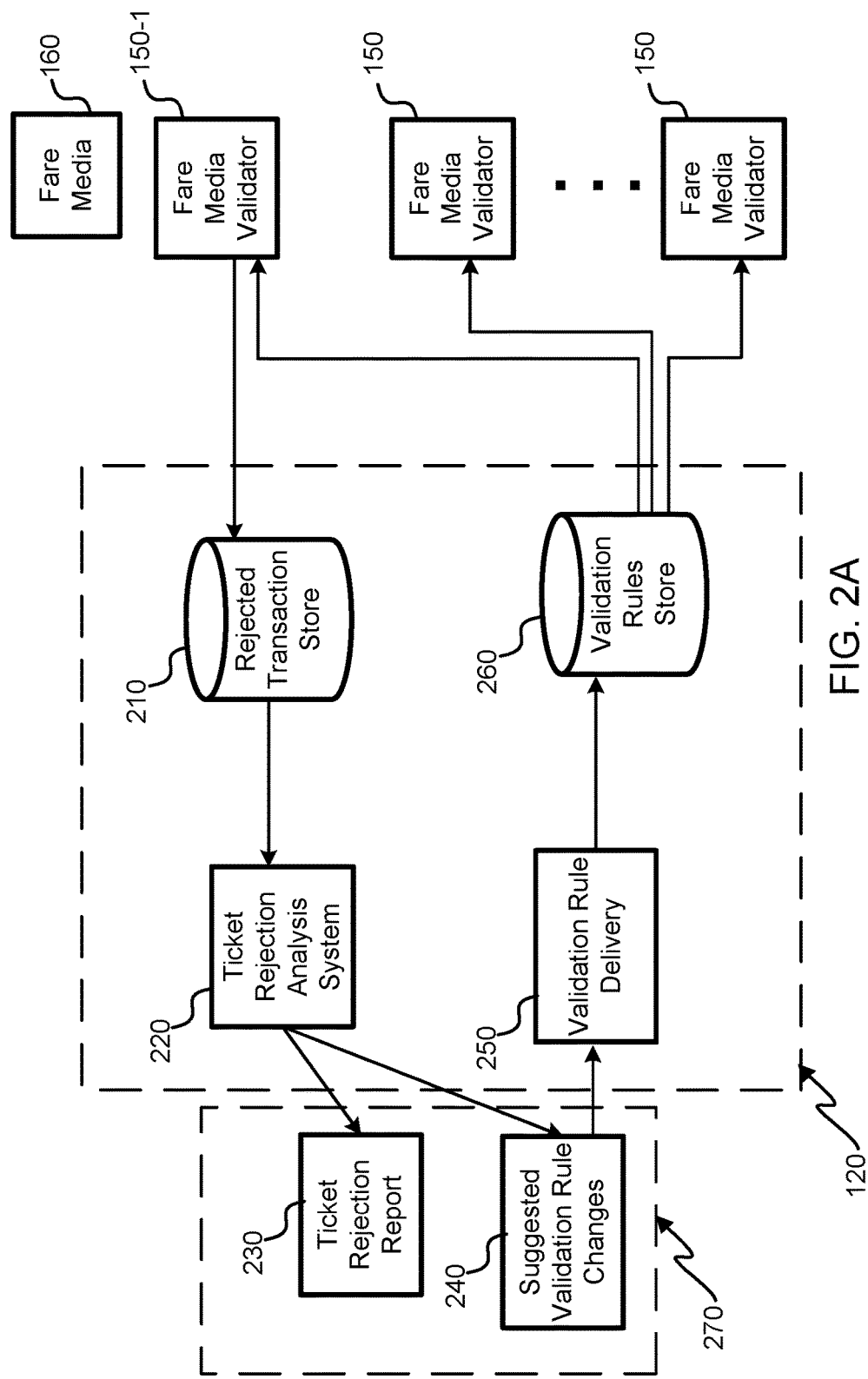
FIGS. 2A and 2B are simplified block diagrams of components of a transit system (such as the transit system of FIG. 1) that can be utilized to automatically update validation rules based on transaction information analysis, according to embodiments.
Figure 2B:
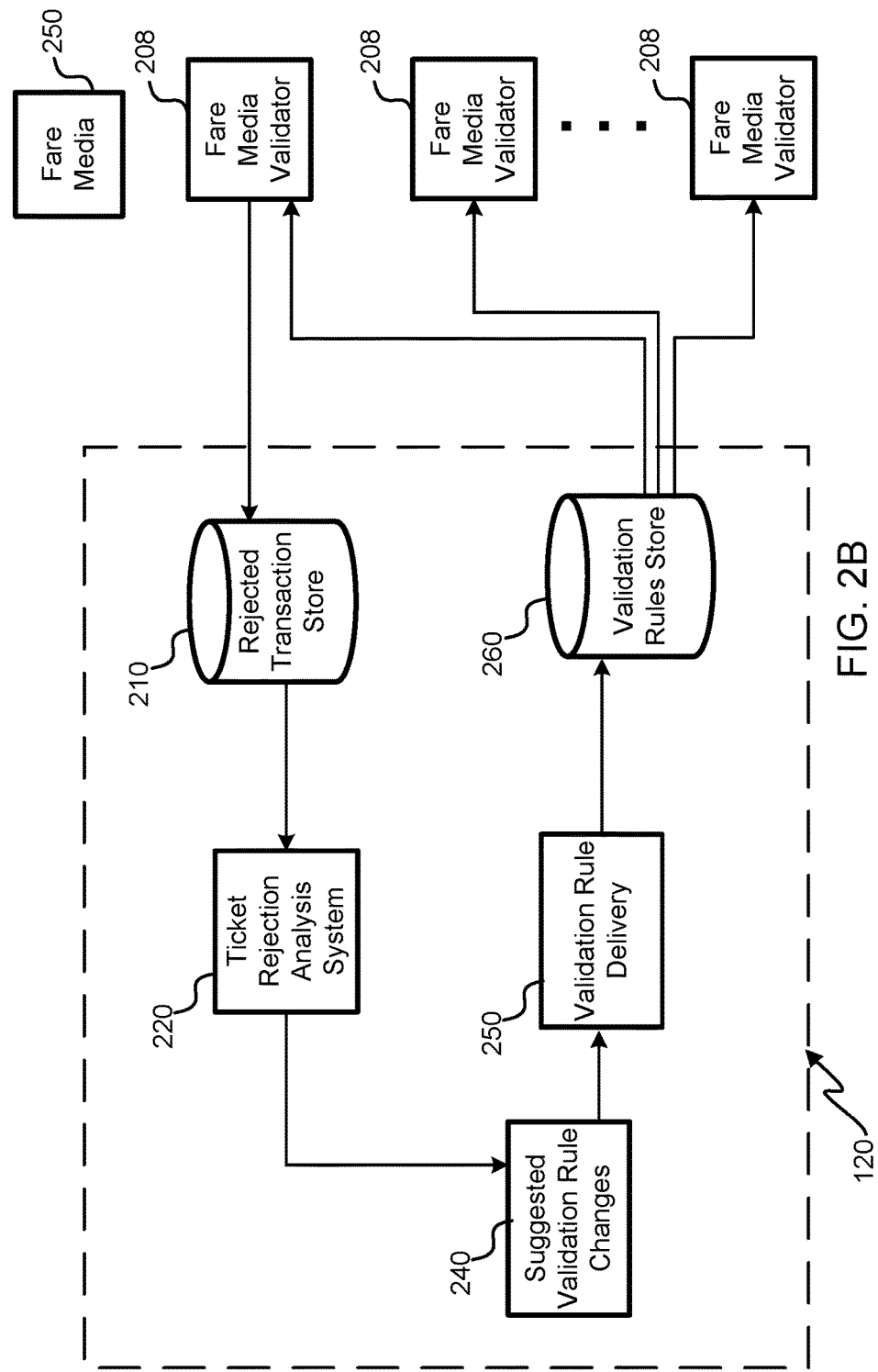

FIG. 2A is a simplified block diagram of components of a transit system that can be utilized to automatically update validation rules based on transaction information analysis, according to one embodiment. It should be understood that only a subset of the components of a transit system are illustrated in FIG. 2A. A transit system may further comprise additional components (such as those shown in FIG. 1). Additionally, components the fare media validators 150 may correspond to fare media validators of a traditional transit system (such as the transit system 100 of FIG. 1). Communication between components may be made via a communication network (not shown), such as the data communication network 110 of FIG. 1.

In the embodiment shown in FIG. 2A, the transit system components include a rejected transaction store 210, ticket rejection analysis system 220 that produces a ticket rejection report 230 and suggested validation rule changes 240. The transit system components include a validation rule delivery component 250 and validation rule store 260. Optionally, as shown here, the rejected transaction store 210, ticket rejection analysis system 220, validation rule delivery component 250, and validation rule store 260 may be implemented on a backend system 120 (such as the backend system 120 of FIG. 1). Additionally or alternatively, the ticket rejection report 230 and suggested validation rule changes 240 (which may be files, data structures, or other software structures configured to convey information) can be sent to a backend interface 270 for review and/or interaction by a transit operator or other human supervisor.

The operation of the transit system components shown in FIG. 2A can proceed generally as follows. A transit user can present a fare media 160 at a fare media validator 150-1. Depending on the type of fare media, this may involve positioning the fare media 160 so that a fare media reader of the fare media validator 150-1 can access information on the fare media 160 via wireless, optical, magnetic, and/or other means. Information read from the fare media 160 can include ticket type (e.g., an indicator that the transit authority can use to categorize the ticket), validity data (geographical restrictions, time restrictions, date restrictions, etc.), concessions (senior citizen discounts, student discounts, etc.), special rules (group tickets (e.g., only valid if three people travel together), valid only with particular transit authorities, etc.), and the like. In some embodiments, fare media 160 may include additional information. Depending on desired functionality, this additional information may not be read from the fare media 160.

Once the fare media validator reads the validation information from the fare media 160, it can use the validation information to validate the fare media 160. This can include matching the validation information against validation rules to determine whether the fare media 160 is valid for passage through an access control point associated with the fare media validator 150-1. As discussed above, these validation rules can comprise pre-stored business rules defined by the transit authority that are stored locally at the fare media validators 150 and/or at other devices (such as station servers 140) that make such rules readily available to the fare media validators 150 for validation. The outcome of the validation determination by the fare media validator 150-1 may be binary: the fare media 160 is either valid or not valid. If it is determined that the fare media 160 is not valid, the fare media validator 150-1 can send an indication of the rejection of the fare media 160 to the rejected transaction store 210. The fare media validator 150-1 may also send additional information read from the fare media 160 to the rejected transaction store 210. Additionally, according to some embodiments, the fare media validator 150-1 may cause an access control point to physically deny passage of a transit user through the access control point (by not opening a gate, for example). In some embodiments, after a fare media 160 has been rejected, the fare media validator 150-1 may additionally direct the transit user to a service agent. In some embodiments, rejected transaction information sent by fare media validators 150 can be collected by the station server (e.g., station server 140 of FIG. 1), which can then send the rejected transaction information, in aggregate, to the rejected transaction store 210. The transmittal of this information from the station server to the rejected transaction store 210 can be based on a triggering event (e.g., the receipt of a threshold number of rejected transactions, the threshold amount of time passing from when the initial rejected transaction was received, etc.), a schedule, and the like.

The rejected transaction store 210 can then provide information regarding the rejected transactions to the ticket rejection analysis system 220. This information can vary, depending on desired functionality. In some embodiments, for example, the information provided by the rejected transaction store 210 can include a summary of the rejected transactions. In other embodiments, the information may include all of the rejected transaction information provided from various fare media validators 150. The rejected transaction store 210 can accumulate rejected transaction information from the various fare media validators 150 of the transit system over a period of time, and then send the information to the ticket rejection analysis system 220 periodically, based on a schedule, based on a triggering event (e.g., a request from the ticket rejection analysis system 220), and the like.

The ticket rejection analysis system 220 can then analyze the information provided by the rejected transaction store 210 to determine whether validation rules may need to be adjusted, based on the information. The ticket rejection analysis system 220, which can comprise a hardware and/or software module or device, can analyze the information by reviewing the rejected transactions and determining at least one common characteristic among all or a subset of the rejected transactions. This analysis may further include determining that a threshold number of transactions were rejected in a threshold amount of time (e.g., within a certain number of minutes, hours, etc.). From this analysis, the ticket rejection analysis system 220 may then determine a proposed validation rule change in response to the rejected transaction information. The proposed validation rule change can, if implemented by the fare media validators 150 of the transit system, cause fare media validators 150 to validate fare media 160 that would not have been validated without the validation rule change.

After the analysis, the ticket rejection analysis system 220 can then generate the ticket rejection report 230 and the suggested validation rule change 240, which it may then provide to the backend interface 270 for review and/or interaction by a transit operator. The backend interface 270 can comprise a computer or similar device capable of providing information and interacting with a transit operator. In some embodiments, for example, the backend interface 270 can provide information regarding the ticket rejection report 230 and the suggested validation rule changes 240 in a graphical user interface (GUI) presented to the transit operator. The transit operator can then review this information and, based on this information, interact with the backend interface 270 to authorize the suggested validation rule changes, refuse them, or edit the suggested validation rule changes before they are authorized.

Validation rules that have been accepted (including those that may have been edited before being accepted) can then be provided to the validation rule delivery component 250. In some embodiments, the validation rule delivery component 250 may comprise a hardware and/or software component of the backend system 120 capable of receiving the validation rules from the backend interface 270 and ensuring that the validation rules are stored in the validation rules store 260.

The validation rules store 260 can comprise a database or other data structure in which validation rules are stored. As indicated in FIG. 2A, the validation rules store 260 may be part of the backend system 120. However, in alternative embodiments, the validation rules store 260 may be distinct and/or remote from the backend system 120. The validation rules store 260 stores the validation rules to be propagated to fare media validators 150 throughout the transit system. Depending on desired functionality, the propagation of the validation rules in the validation rules store 260 may vary. In some embodiments, for example, the backend system 120 may send the validation rules in the validation rules store 260 to various fare media validators 150 based on a triggering event (such as receiving new validation rules from the validation rule delivery component 250). The backend system 120 may additionally or alternatively propagate validation rules in the validation rules store 260 periodically, based on the certain schedule, and the like. Also depending on desired functionality, the backend system 120 may send only the validation rules have changed or been added, or may send an entirely new set of validation rules for fare media validators 150 to implement to validate fare media 160.

Depending on desired functionality and/or the factors of a particular situation, the process of gathering rejected transaction information and implementing the validation rules in response, using the components illustrated in FIG. 2A, can take a matter of minutes or hours, depending on the particular scenario. (Other scenarios may take a larger or smaller amount of time.) In traditional transit systems (e.g., transit system 100 of FIG. 1), on the other hand, this process can take days or longer (assuming a problem resulting in rejected transactions is identified in the first place). In transit, identifying and alleviating problems resulting in rejected transactions is extremely important because rejected transactions result in transit users not being able to travel and causing increased traffic and potential delays in the transit system. Additionally, the components illustrated in FIG. 2A can make it easier to apply business rules for validation among fare media validators 150 of the transit system, streamlining updates of validation rules (base data) to the fare media validators 150.

FIG. 2B is a simplified block diagram of components of a transit system that can be utilized to automatically update validation rules based on transaction information analysis, according to another embodiment. Most of the components correspond to similarly-labeled components of the embodiment illustrated in FIG. 2A. Here, however, a backend interface 270 and a ticket rejection report 230 are not provided. Instead, the implementation of validation rule changes is fully automated within the backend system 120. In other words, according to this embodiment, there does not need to be human oversight by a transit operator to implement the validation rule changes. Accordingly, the components illustrated in FIG. 2B operate similar to their counterparts in FIG. 2A, with the primary difference being that suggested rule changes 240 are not authorized by a human transit operator, but instead are implemented automatically. The ticket rejection analysis system 220 can therefore provide the suggested validation rule changes 240 directly to the validation rule delivery component 250.

Some embodiments could implement the functionality described in both FIGS. 2A and 2B, depending on the scenario. In certain cases or for certain suggested validation rule changes (e.g., those that would alleviate clear validation rule errors, those implemented in emergencies, etc.) the suggested validation rule changes may be implemented automatically. In other cases, suggested validation rule changes can be approved by a human supervisor.

Figure 3:
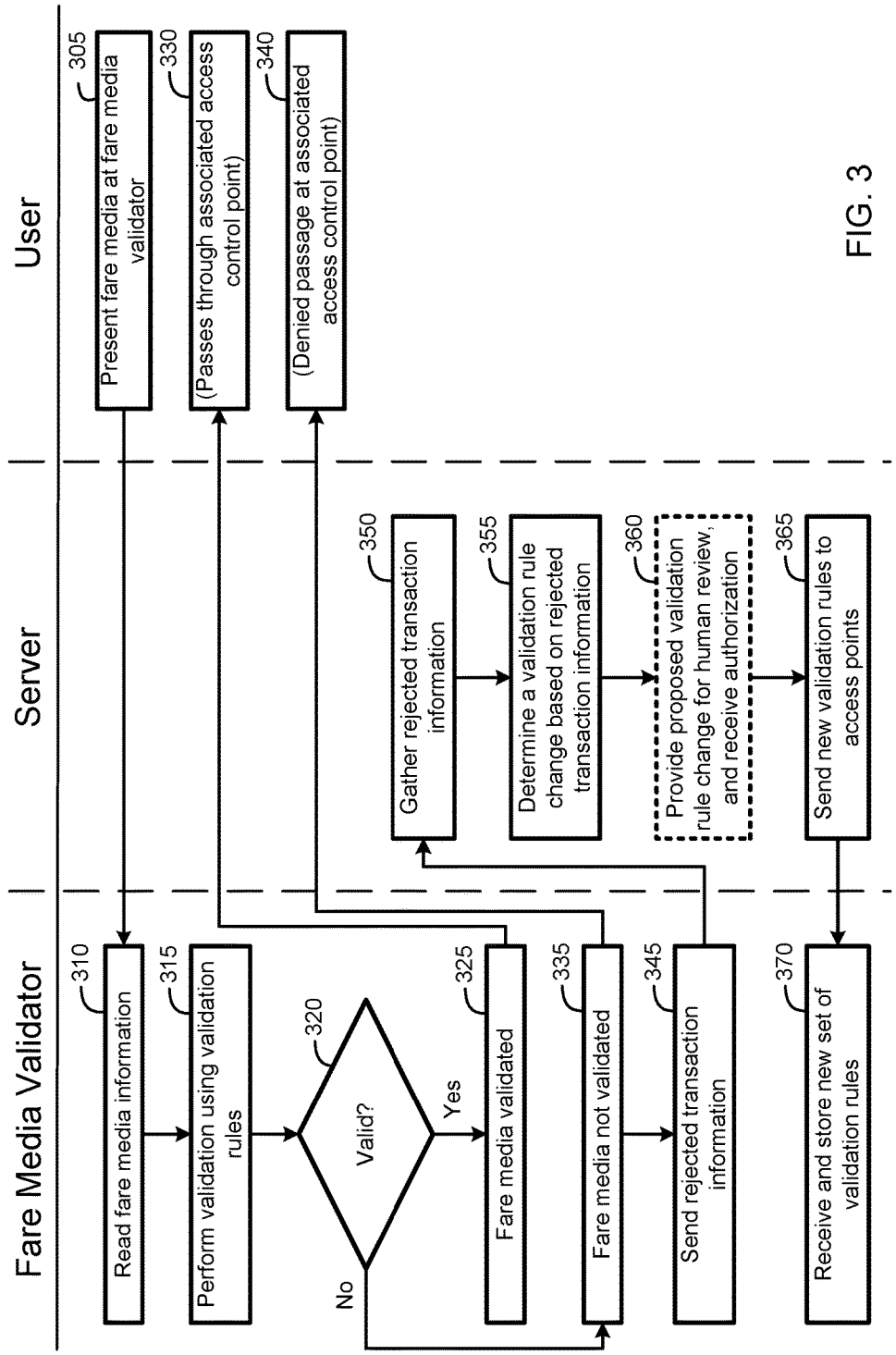
FIG. 3 is a swim-lane diagram indicating the various actions of a user, fare media validator, and a server, according to an embodiment.

FIG. 3 is a swim-lane diagram indicating the various actions of a user, fare media validator, and a server, according to an embodiment. Here, the user may be a transit user attempting to travel through a transit system, the fare media validator may be one of many fare media validators within the transit system (as described in previous embodiments), and the server may be a computer or other device operated by the transit authority (such as the backend system 120 of FIG. 1).

It will be understood that, in alternative embodiments, additional or alternative entities may perform one or more of the functions illustrated in FIG. 3. For example, the functions performed by the server may be performed by two or more computers or other devices. Additionally or alternatively, it will be understood that the functions shown in the blocks of FIG. 3 may be altered depending on desired functionality. For example, functions may be added, omitted, performed simultaneously, and the like. A person of ordinary skill in the art will appreciate that alternative embodiments may include variations such as these.

At block 305 the user presents the fare media at the fare media validator. As indicated in previous embodiments this may vary, depending on the type of fare media utilized. For example, a fare media may comprise the card width a magnetic stripe, which is read by a magnetic card reader of the fare media validator. Other fare media may include barcodes or other visible markers, radio frequency (RF) circuits, and the like, and the fare media validator may be equipped with one or more readers to enable reading of the fare media. In some embodiments, barcodes or similar visual markers may be encrypted.

At block 310, the fare media information is read by the fare media validator. Information read by the fare media validator may vary, depending on desired functionality. This information can include, for example, ticket type, validity data, concessions, special rules, and/or other information that can be used by the fare media validator to validate the fare media and grant the transit user passage through an associated access control point.

At block 315, the fare media validator performs validation using validation rules. As previously indicated, validation rules (or base data) our business rules used to determine how to validate a fare media. In some embodiments, for example, ticket information may indicate that the ticket is valid at certain zones or stations, at certain times (peak, off-peak, etc.), on certain days (workdays, weekends, holidays, etc.), and the like. The fare media validator can use the validation rules to determine whether the ticket is being used correctly.

At block 320, the fare media validator determines whether the fare media is valid (being used correctly). If the fare media validator determines that the fare media is valid, the fare media validator validates the fare media at block 325, and the user passes through an access point associated with the fare media validator at 330. The granting of passage by the fare media validator may involve causing an associated access control point to move a physical obstacle (such as a gate), enable a physical obstacle (such as a turnstile) to be moved by the user, show the user an indication that the ticket is valid (by flashing a light, displaying a message, etc.), and the like.

If the fare media validator determines that the fare media is not valid, the fare media validator does not validate the fare media at 335, and the user is correspondingly denied entry at the associated access control point block 340. The fare media validator may cause the access control point to deny the user passage through fare media validator my not moving a physical obstacle (such as a gate), placing a physical obstacle in front of the user to prohibit the user's passage, locking or otherwise restricting a physical obstacle (such as a turnstile) so that it cannot be moved (or cannot be moved easily) by the user, showing the user an indication that the ticket is not valid (by flashing a light, displaying a message, etc.), and the like.

At block 345 the fare media validator further sends rejected transaction information to the server. This rejected transaction information may include an indication of the denial of passage of the user as well as information regarding the fare media (such as information read from the fare media at block 310). As noted above, the fare media validator can send the rejected transaction information after each denial of passage of a user, or it can send the rejected transaction information as part of a larger transmission of data that may include information for a plurality of rejected transactions by the fare media validator. The larger transmission may be sent periodically, on a schedule, based on the triggering event (such as receiving a threshold number of rejected transactions), and the like.

At block 350, the server gathers the rejected transaction information from the fare media validator. Here, the server may, over a period of time, gather rejected transaction information from a plurality of fare media validators located throughout the transit system. In so doing, the server is able to determine whether larger trends are occurring within the transit system they can be alleviated through the change of validation rules, or whether a particular fare media validator may be having difficulties validating tickets.

At block 355, the server determines a validation rule change based on the rejected transaction information (which may include a rejected transaction information from a plurality of fare media validators within the transit system). The functionality at block 355 may be triggered by a variety of triggering events. For example, the server may determine to perform the functionality of block 355 after having received a threshold number of rejected transactions.

The determination of a validation rule change may be made in accordance with predetermined business rules, depending on desired functionality. This determination may be based on an identifiable common feature among the rejected transactions of the rejected transaction information. For example, the server may, upon receiving a threshold number of rejected transactions, analyze the rejected transaction information to determine that a threshold number of non-peak-time tickets have been rejected at validators during designated peak times within the transit system. After identifying a common feature (the tickets are non-peak-time tickets) among a threshold number of the rejected transactions, the server can use business rules to determine whether to allow these non-peak-timed tickets at validators within the transit system during designated peak times. Depending on the governing business rules, the server may determine a validation rule change based on determining times at which the rejected transactions were made. (If, for example, a threshold number of the rejected transactions were made within a certain window during the designated peak times, the validation rule change could, if implemented, allow these non-peak-time tickets to be validated at fare media validators within the transit system during this window.) Alternatively, the server may determine a validation rule change based on times during which the field tickets are valid. (If, for example, a threshold number of the non-peak-time tickets are valid between 9:00 AM and 4:00 PM, the server may determine a validation rule change that would extend this window so that the rejected tickets would be valid from 8:30 AM to 4:30 PM.)

Depending on the various factors used in the determination by the server, the validation rule changes may apply to only a portion of the fare media validators within the transit system. For example, the validation rule change may be applicable only to fare media validators within a certain zone or region of the transit system, or may only impact fare media validators along a particular train line or at a particular station. Accordingly, in some embodiments, the validation rule changes made to be propagated only to those fare media validators that are impacted by the validation rule changes. In other embodiments, the validation rule changes may nonetheless be propagated to all fare media validators within a transit system. However the validation rule changes may identify the fare media validators that are affected, thereby enabling fare media validators that are not affected by the validation rule changes to ignore them.

In determining a validation rule change at block 355, the server can identify any of a variety of common characteristics among the fare media of the rejected transaction information. These characteristics can include, for example, any of the information read from the fare media, ticket type, concessions, special rules, and the like. These characteristics may also include information known by the transit system that may be identified using the information read from the fare media. This can include, for example, an encryption key used in a bar code or similar tickets. In this case, the server may identify the various fare media used in the rejected transactions (and perhaps also determine from the rejected transaction information that transactions were determined to be invalid due to an inaccurate encryption key) and determine that the common encryption key is used to decrypt all of the fare media of the rejected transactions during validation. In these cases, the server me suggest a validation rule change that includes using a different encryption key.

Optionally, at block 360, the server will provide proposed validation rule change information for human review, and receive authorization from the human. As indicated in FIG. 2A discussed previously, the proposed validation rule change information can be presented to a transit system operator (or other human overseeing the change of validation rules) using a backend interface 270. Other information, such as a ticket rejection report 230 may also be presented to help the human operator determine whether suggested validation rule changes should be implemented. Once authorization is received, the process may proceed to block 365. (If authorization is not received, and the process shown in FIG. 3 may end at this point.)

Authorization can be received in any of a variety of ways, depending on desired functionality. In some embodiments, for example, a human operator may provide an authorization input via a user interface (such as the backend interface 270 of FIG. 2A), by pressing a button, selecting an item on a touchscreen, or interacting similarly with the user interface.

At block 365, the server sends the new validation rules to the fare media validators of the transit system. Here, the "new validation rules" may include a set of all validation rules (i.e., "base data") including the validation rule change determined at block 355. (Alternatively, according to some embodiments, the "new validation rules" of blocks 365 may include only validation rules impacted (e.g., added or changed) by the validation rule change of blocks 355.) As noted previously, the propagation of the new validation rules may vary, depending on the desired functionality of the embodiment. In some embodiments, for example, the new validation rules may be sent to all fare media validators within the transit system. In some embodiments, the new validation rules may be sent only to those fare media validators impacted by the validation rule changes embodied by the new validation rules.

At block 370 the fare media validator receives and stores a new set of validation rules. As suggested above, the fare media validator may be one of many fare media validators within the transit system that received the new validation rules. Once these validation rules are received and stored by the fare media validator, the fare media validator can then use these new validation rules during the subsequent validation of fare media presented at the fare media validator.

Figure 4:
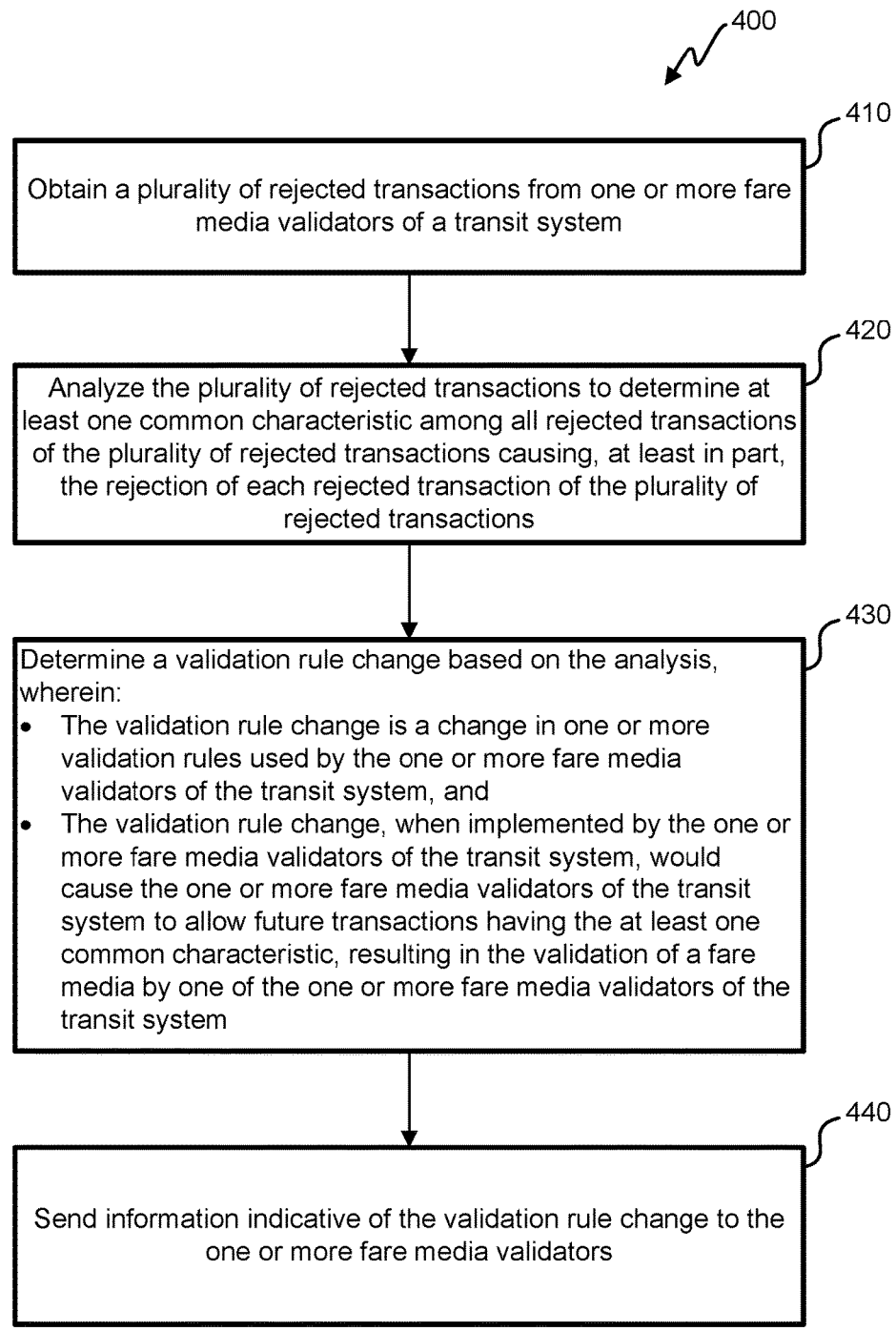
FIG. 4 is a flow diagram illustrating a method of automatically determining a validation rule change within a transit system, according to one embodiment.

FIG. 4 is a flow diagram illustrating a method 400 of automatically determining a validation rule change within a transit system, according to one embodiment. The method may be performed by a server within a transit system, such as the server of FIG. 3 and/or the backend system 120 of FIG. 1. Means for performing the functions illustrated in the method 400 can include hardware and/or software components as illustrated below in FIG. 5.

At block 410, a plurality of rejected transactions is obtained from one or more fare media validators of a transit system. As indicated previously, fare media validators may be incorporated into access control points (e.g., turnstiles, gates, and the like), handheld validation devices used by transit operators (e.g., to validate fare media on a train), and the like. As indicated in the embodiments discussed above, the server can obtain these rejected transactions from the one or more fare media validators via a data communication network over a period of time. Each rejected transaction of the plurality of rejected transactions can be indicative of when a fare media was not able to be validated by one of the one or more fare media validators of the transit system. Traditional transit systems may not be configured to collect rejected transaction information in this manner (other than, perhaps, collecting a log locally at the fare media validator). Thus, the fare media validators of the system (and, correspondingly, the server and/or other devices performing the functions of the method 400 of FIG. 4) may need to be configured differently than in traditional transit systems to execute embodiments described herein. It will be appreciated by a person of ordinary skill in the art that the techniques described herein can provide for a more efficient manner of identifying and correcting problems and validation rules, thereby increasing the efficiency of one or more devices within the transit system. It can be further appreciated the techniques provided herein are not simply automating previously-known techniques for validation rule changes. The processes of gathering data from fare media validators and conducting the analyses described herein, along with propagating the validation rules in the manner described in the disclosed techniques, are individually and/or collectively unique.

At block 420, the plurality of rejected transactions is analyzed to determine at least one common characteristic among all rejected transactions of the plurality of rejected transactions causing, at least in part, the rejection of each rejected transaction of the plurality of rejected transactions. As noted above, this common characteristic can include any of a variety of different characteristics that caused (at least in part) the rejection of the transactions. This includes information read from the fare media (e.g., ticket type, concession, etc.) and/or information determined separately (e.g., an encryption key), based on the information read from the fare media.

At block 430, a validation rule change is determined based on the analysis. Here, the validation rule change as a change in one or more validation rules used by the one or more fare media validators of the transit system, and the validation rule change, when implemented by the one or more fare media validators of the transit system, would cause the one or more fare media validators of the transit system to allow future transactions having the at least one common characteristic, resulting in the validation of a fare media by one of the one or more fare media validators of the transit system.

At block 440 information indicative of the validation rule change is sent to the one or more fare media validators. Here, sending the information may be direct or indirect, depending on desired functionality. In the previously-described in embodiments, for example, a server (e.g., backend server) may send new validation rules indicative of the validation rule change to fare media validators via the data communication network in which information is relayed to the fare media validators by a station server.

It will be understood that embodiments may implement additional or alternative features to those shown in the method 400 of FIG. 4. Alternative embodiments can, for example, add, omit, combine, and/or separate functions shown in FIG. 4, or perform two or more of them simultaneously. A person of ordinary skill in the art will recognize many variations to the method 400 shown in FIG. 4.

Depending on desired functionality, the method 400 can include additional features. In some embodiments, for example, the method may include generating a report for review by a user, and sending the information indicative of the validation rule based on an authorization input from the user. An authorization input may be received via a backend interface as described in embodiments above. In some embodiments, prior to analyzing the plurality of rejected transactions, the method may further comprise determining that the plurality of rejected transactions comprises at least a threshold number of rejected transactions and/or determining that the plurality of rejected transactions occurred within a threshold period of time. The least one common characteristic can include any of a variety of characteristics as detailed in the previously-described embodiments. These characteristics can include, for example, a time period during which a fare media is valid, a date during which a fare media is valid, a location in which a fare media is valid, an encryption key of a fare media, a concession related to a fare media, a fare media type, or any combination thereof. Obtaining the plurality of rejected transactions may comprise obtaining them from a remote database, such as a rejected transaction store 210 as described in FIG. 2A. Additionally or alternatively, the plurality of rejected transactions may be obtained from the one or more fare media validators in the transit system over a period of time (either directly or indirectly via the data communication network).

Figure 5:
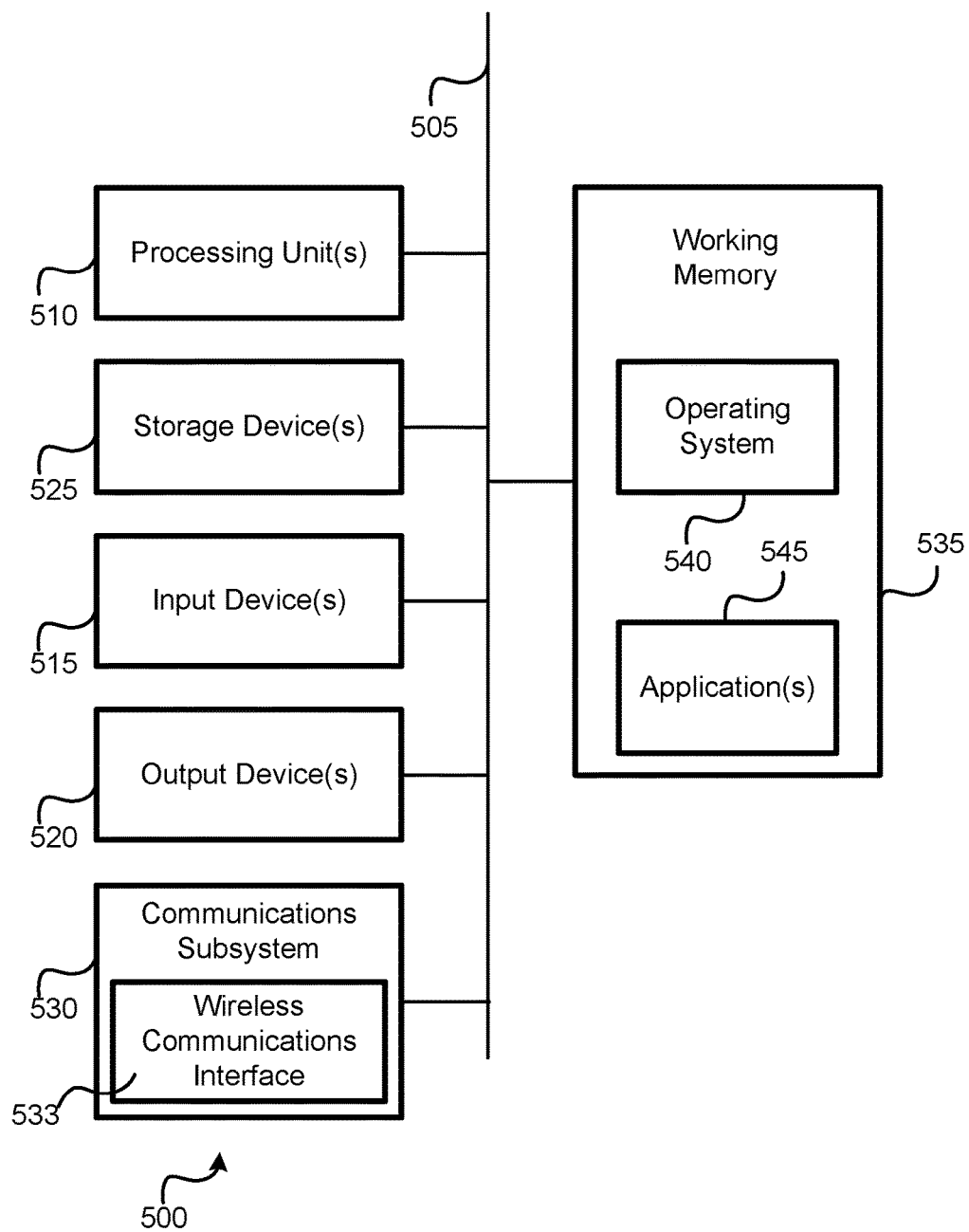
FIG. 5 is a block diagram of an embodiment of a computer system.

FIG. 5 illustrates an embodiment of a computer system 500, which may be incorporated, at least in part, into a backend system 120 or station server 140 described in FIG. 1, a backend interface 270 of FIG. 2A, a server of FIG. 3, other computing devices in the embodiments disclosed herein, and/or a computing device incorporated and/or communicatively connected therewith, as described herein. FIG. 5 provides a schematic illustration of one embodiment of a computer system 500 that can perform the methods provided by various other embodiments, such as the method described in relation to FIG. 4. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. In addition, it can be noted that components illustrated by FIG. 5 can be localized to a single device and/or distributed among various networked devices, which may be disposed at different physical locations.

The computer system 500 is shown comprising hardware elements that can be electrically coupled via a bus 505 (or may otherwise be in communication, as appropriate). The hardware elements may include processing unit(s) 510, which may comprise without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 4. The computer system 500 also may comprise one or more input devices 515, which may comprise without limitation a mouse, a keyboard, a camera, a microphone, and/or the like; and one or more output devices 520, which may comprise without limitation a display device, a printer, and/or the like.

The computer system 500 may further include (and/or be in communication with) one or more non-transitory storage devices 525, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which may comprise wireless communication technologies managed and controlled by a wireless communication interface 533, as well as wired technologies. As such, the communications subsystem may comprise a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The communications subsystem 530 may include one or more input and/or output communication interfaces, such as the wireless communication interface 533, to permit data to be exchanged with a network, other computer systems, and/or any other electronic devices described herein.

In many embodiments, the computer system 500 will further comprise a working memory 535, which may comprise a RAM or ROM device, as described above. Software elements, shown as being located within the working memory 535, may comprise an operating system 540, device drivers, executable libraries, and/or other code, such as one or more applications 545, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 4, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. For example, the computer system 500 and software elements can be used to gather rejected transaction information and determine a validation rule change (or a new set of base data) as described herein. A fare media validator may also incorporate one or more components of the computer system 500 and software elements to be able to read fare media information, perform validation, and/or implement validation rules, as described herein.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium used for storing data, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. A computer server comprising:
    a communication interface configured to obtain a plurality of rejected transactions from one or more fare media validators of a transit system, each rejected transaction of the plurality of rejected transactions indicative of when a respective fare media was not able to be validated by one of the one or more fare media validators of the transit system when the respective fare media was presented at the one of the one or more fare media validators of the transit system; and
    a processing unit coupled with the communication interface and configured to:
        analyze the plurality of rejected transactions to determine at least one common characteristic among all rejected transactions of the plurality of rejected transactions causing, at least in part, the rejection of each rejected transaction of the plurality of rejected transactions;
        determine a validation rule change based on the analysis of the plurality of rejected transactions, wherein:
            the validation rule change is a change in one or more validation rules used by the one or more fare media validators of the transit system, and
            the validation rule change, when implemented by the one or more fare media validators of the transit system, is configured to cause the one or more fare media validators of the transit system to allow future transactions having the at least one common characteristic, resulting in:
                the one or more fare media validators of the transit system validating fare media used in the future transactions when the fare media is presented at the one or more fare media validators of the transit system,
                the one or more fare media validators of the transit system activating an access control point associated with the one or more fare media validators of the transit system in response to the validating fare media, and
                the activated access control point associated with the one or more fare media validators of the transit system moving a physical obstacle to grant one or more users of the fare media physical access to the transit system; and
        send, via the communication interface, information indicative of the validation rule change to the one or more fare media validators.

2. The computer server of claim 1, wherein the processing unit is further configured to:
    generate a report for review by a user; and
    send the information indicative of the validation rule change based on an authorization input from the user.

3. The computer server of claim 1, wherein the processing unit is further configured to, prior to analyzing the plurality of rejected transactions, determine that the plurality of rejected transactions comprises at least a threshold number of rejected transactions.

4. The computer server of claim 1, wherein the processing unit is further configured to, prior to analyzing the plurality of rejected transactions, determine that the plurality of rejected transactions occurred within a threshold period of time.

5. The computer server of claim 1, wherein the processing unit is configured to determine the at least one common characteristic indicative of at least one of:
    a time period during which a fare media is valid,
    a date during which a fare media is valid,
    a location in which a fare media is valid,
    an encryption key of a fare media,
    a concession related to a fare media, or
    a fare media type, or
    any combination thereof.

6. The computer server of claim 1, wherein the processing unit is configured to cause the communication interface to obtain a plurality of rejected transactions from a remote database.

7. The computer server of claim 1, wherein the processing unit is configured to cause the communication interface to obtain a plurality of rejected transactions from the one or more fare media validators in the transit system over a period of time.

8. A method of updating one or more validation rules in a transit system, the method comprising:
  obtaining a plurality of rejected transactions from one or more fare media validators of the transit system, each rejected transaction of the plurality of rejected transactions indicative of when a respective fare media was not able to be validated by one of the one or more fare media validators of the transit system when the respective fare media was presented at the one of the one or more fare media validators of the transit system;
  analyzing, with a processing unit, the plurality of rejected transactions to determine at least one common characteristic among all rejected transactions of the plurality of rejected transactions causing, at least in part, the rejection of each rejected transaction of the plurality of rejected transactions;
  determining a validation rule change based on the analyzing, wherein:
    the validation rule change is a change in the one or more validation rules used by the one or more fare media validators of the transit system, and
    the validation rule change, when implemented by the one or more fare media validators of the transit system, is configured to cause the one or more fare media validators of the transit system to allow future transactions having the at least one common characteristic, resulting in:
      the one or more fare media validators of the transit system validating fare media used in the future transactions when the fare media is presented at the one or more fare media validators of the transit system,
      the one or more fare media validators of the transit system activating an access control point associated with the one or more fare media validators in response to the validating fare media, and
      the activated access control point associated with the one or more fare media validators of the transit system moving a physical obstacle to grant one or more users of the fare media physical access to the transit system; and
  sending information indicative of the validation rule change to the one or more fare media validators.

9. The method of updating the one or more validation rules in the transit system of claim 8, further comprising:
  generating a report for review by a user; and
  sending the information indicative of the validation rule change based on an authorization input from the user.

10. The method of updating the one or more validation rules in the transit system of claim 8, further comprising, prior to analyzing the plurality of rejected transactions, determining that the plurality of rejected transactions comprises at least a threshold number of rejected transactions.

11. The method of updating the one or more validation rules in the transit system of claim 8, further comprising, prior to analyzing the plurality of rejected transactions, determining that the plurality of rejected transactions occurred within a threshold period of time.

12. The method of updating the one or more validation rules in the transit system of claim 8, further comprising determining the at least one common characteristic indicative of at least one of:
  a time period during which a fare media is valid,
  a date during which a fare media is valid,
  a location in which a fare media is valid,
  an encryption key of a fare media,
  a concession related to a fare media, or
  a fare media type, or
  any combination thereof.

13. The method of updating the one or more validation rules in the transit system of claim 8, further comprising obtaining a plurality of rejected transactions from a remote database.

14. The method of updating the one or more validation rules in the transit system of claim 8, further comprising obtaining a plurality of rejected transactions from the one or more fare media validators in the transit system over a period of time.

15. A non-transitory computer-readable medium having instructions embedded thereon for updating one or more validation rules in a transit system, the instructions including computer code for:
  obtaining a plurality of rejected transactions from one or more fare media validators of the transit system, each rejected transaction of the plurality of rejected transactions indicative of when a respective fare media was not able to be validated by one of the one or more fare media validators of the transit system when the respective fare media was presented at the one of the one or more fare media validators of the transit system;
  analyzing the plurality of rejected transactions to determine at least one common characteristic among all rejected transactions of the plurality of rejected transactions causing, at least in part, the rejection of each rejected transaction of the plurality of rejected transactions;
  determining a validation rule change based on the analyzing, wherein:
    the validation rule change is a change in the one or more validation rules used by the one or more fare media validators of the transit system, and
    the validation rule change, when implemented by the one or more fare media validators of the transit system, is configured to cause the one or more fare media validators of the transit system to allow future transactions having the at least one common characteristic, resulting in:
      the one or more fare media validators of the transit system validating fare media used in the future transactions when the fare media is presented at the one or more fare media validators of the transit system,
      the one or more fare media validators of the transit system activating an access control point associated with the one or more fare media validators of the transit system in response to the validating fare media, and
      the activated access control point associated with the one or more fare media validators of the transit system moving a physical obstacle to grant one or more users of the fare media physical access to the transit system; and
  sending information indicative of the validation rule change to the one or more fare media validators.

16. The computer-readable medium of claim 15, wherein the instructions further comprise computer code for:
   generating a report for review by a user; and
   sending the information indicative of the validation rule change based on an authorization input from the user.

17. The computer-readable medium of claim 15, wherein the instructions further comprise computer code for, prior to analyzing the plurality of rejected transactions, determining that the plurality of rejected transactions comprises at least a threshold number of rejected transactions.

18. The computer-readable medium of claim 15, wherein the instructions further comprise computer code for, prior to analyzing the plurality of rejected transactions, determining that the plurality of rejected transactions occurred within a threshold period of time.

19. The computer-readable medium of claim 15, wherein the instructions further comprise computer code for determining the at least one common characteristic indicative of at least one of:
   a time period during which a fare media is valid,
   a date during which a fare media is valid,
   a location in which a fare media is valid,
   an encryption key of a fare media,
   a concession related to a fare media, or
   a fare media type, or
   any combination thereof.

20. The computer-readable medium of claim 15, wherein the instructions further comprise computer code for obtaining a plurality of rejected transactions from a remote database.

* * * * *